3 Sheets—Sheet 1.
J. BURDEN.
STEAM-PRESSURE GAGE.
No. 170,706. Patented Dec. 7, 1875.
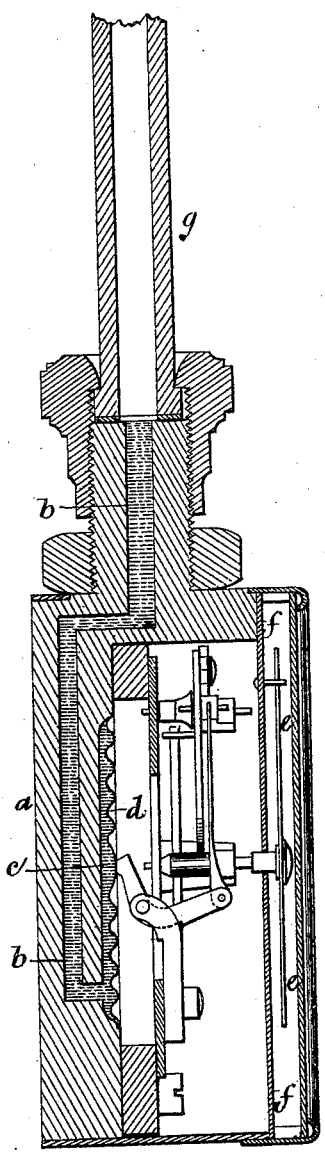
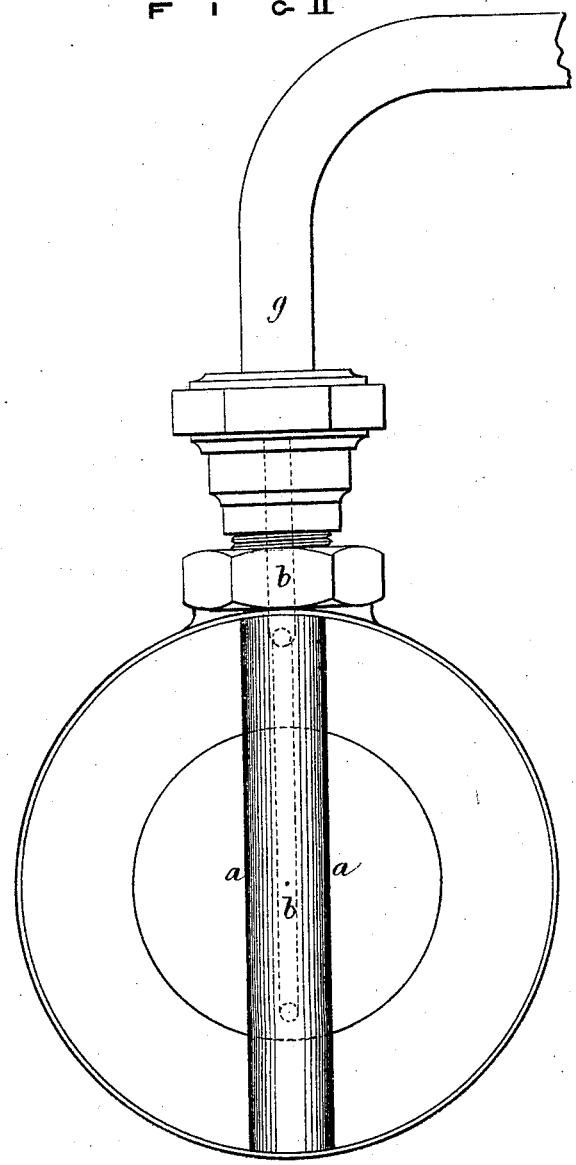
Witnesses,
Richard Skerrett
Henry Skerrett
Inventor
James Burden

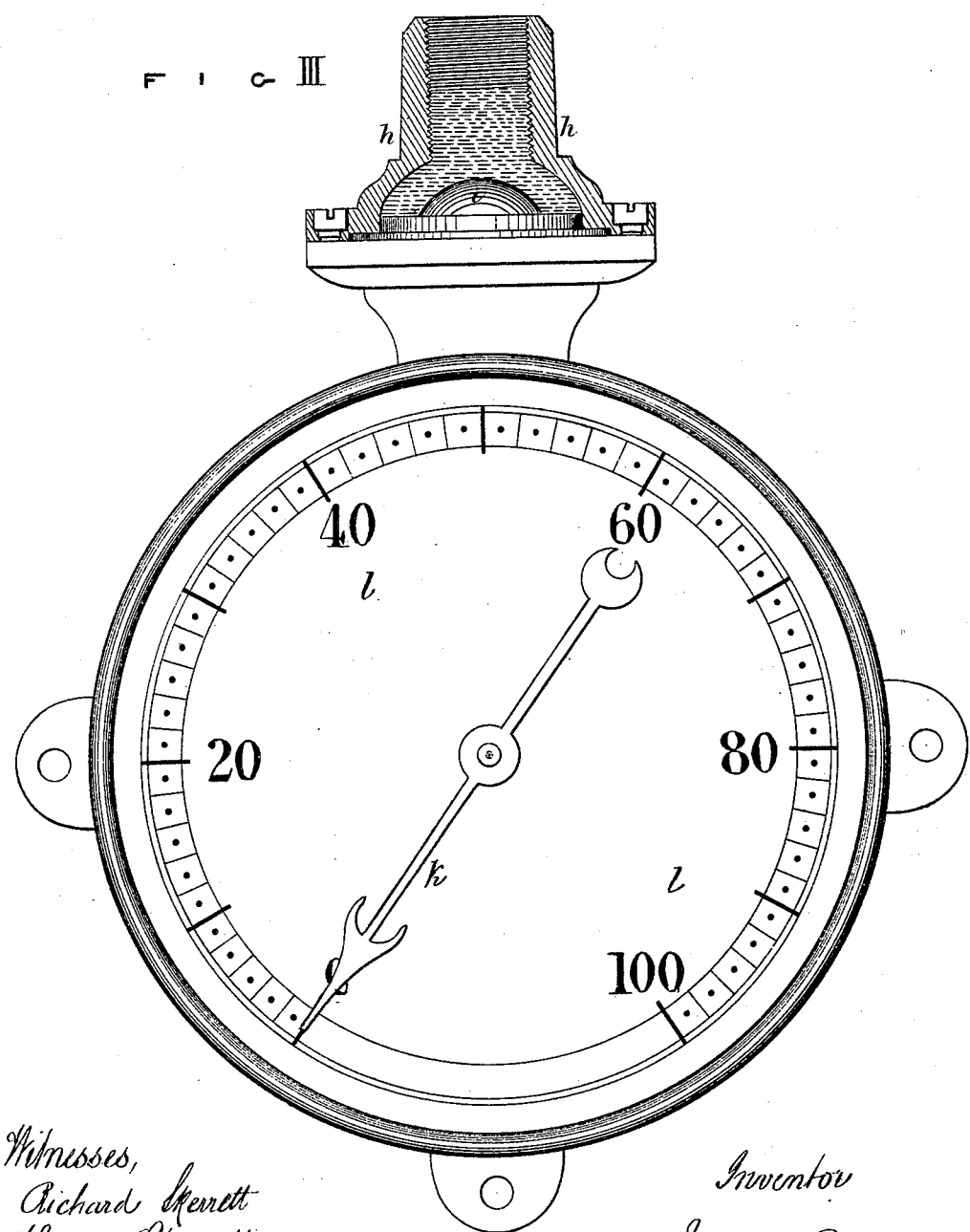

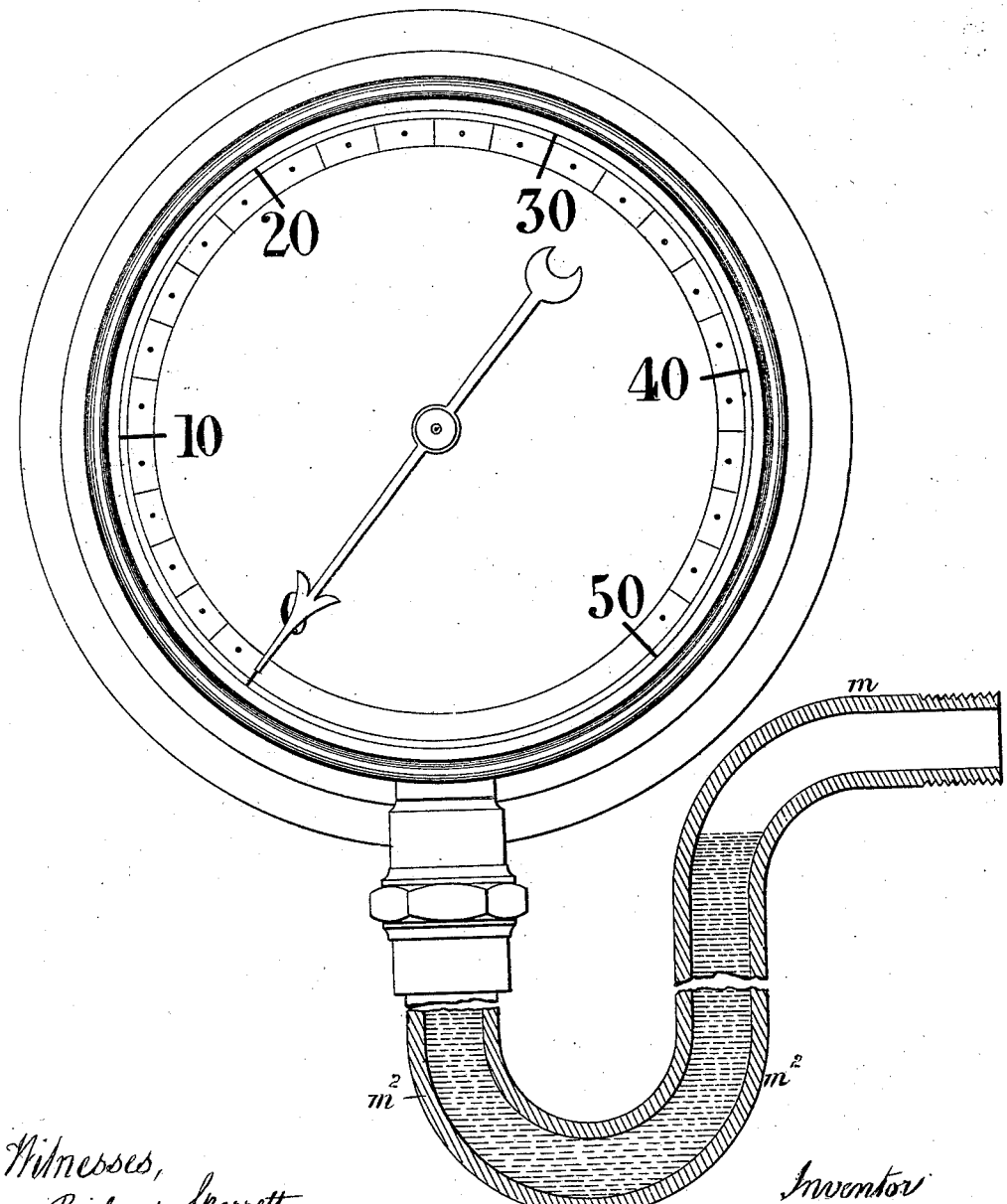

UNITED STATES PATENT OFFICE.

JAMES BURDEN, OF BIRMINGHAM, ENGLAND.

IMPROVEMENT IN STEAM-PRESSURE GAGES.

Specification forming part of Letters Patent No. 170,706, dated December 7, 1875; application filed August 30, 1875.

*To all whom it may concern:*

Be it known that I, JAMES BURDEN, of Birmingham, in the county of Warwick, England, steam, pressure, and vacuum gage maker, have invented Improvements in Steam-Gages, Pressure-Gages, and Vacuum-Gages, of which the following is a specification:

In the said gages, as ordinarily constructed, the steam, atmosphere, or liquid the pressure of which is to be indicated by the gage is in direct communication with a small chamber of the gage, the steam, atmosphere, or liquid usually acting upon a diaphragm, the deflection of which is transmitted to an index-finger traversing a graduated dial.

In consequence of the steam, atmosphere, or liquid coming into contact with the chamber described, the diaphragm becomes oxidized or covered with a deposit, and the gage is thereby injured, and its accurate working impaired. Great inconvenience also results from the freezing of the water which accumulates in the gage, and frequently from the bursting of the gage, consequent on the freezing of the water.

My invention has for its object to remedy the defects referred to; and my said invention consists in wholly preventing the steam, atmosphere, or liquid, the pressure of which is to be indicated, from coming into contact with the interior of the gage. This I effect by placing the pipe which conveys the steam, atmosphere, or liquid, the pressure of which is to be gaged, at the top or highest part of the gage, instead of at the lowest part, as usual, and I fill the small chamber situated between the back of the gage and the diaphragm, and also the passages leading to the said chamber, with quicksilver or mercury. The steam, atmosphere, or liquid in communication with the gage presses upon the mercury in the said chamber, and the said mercury presses upon the diaphragm, the deflection of which is registered in the ordinary way. Thus the steam, atmosphere, or liquid, instead of acting directly upon the diaphragm, acts upon it through the quicksilver or mercury, and the steam, atmosphere, or liquid is thereby prevented from coming into direct contact with the diaphragm of the gage, and injuring the same, as hereinbefore explained; or the connecting-pipe of the gage may be of the usual siphon form, and quicksilver or mercury may be placed in the bent or curved part of the siphon-pipe only, instead of filling the chamber with quicksilver or mercury.

My invention is applicable to gages of various constructions, as well as to gages having diaphragms.

Figure 1 of the accompanying drawings represents in vertical section, and Fig. 2 in back elevation, a steam-gage provided with a corrugated steel diaphragm or disk, the said gage containing my improvements. $a$ is the back or body of the gage, containing the steam-passages $b$ $b$ and diaphragm-chamber $c$. $d$ is the corrugated steel diaphragm or disk of the gage, the deflection of which is transmitted through the mechanism and gearing represented, which constitute no part of my invention, to the index-finger $e$, traversing the graduated dial $f$, and indicates thereon the pressure of the steam. The upper passage $b$, in communication with the diaphragm-chamber $c$, is connected with the pipe $g$, which conveys the steam to be gaged, the said pipe being situated at the top or highest part of the gage. The diaphragm-chamber $c$ and the passages $b$, in communication, are filled with quicksilver or mercury, as indicated by the broken lines in Fig. 1. When the steam to be gaged is admitted into the pipe $g$ it presses upon the mercury in the passages $b$ and chamber $c$, and the said mercury presses upon the corrugated steel diaphragm $d$, and deflects it in the usual manner. The steam is thereby prevented from coming into contact with the diaphragm $d$ of the gage and injuring the said diaphragm.

Fig. 3 represents, in front elevation, (partly in vertical section,) another steam-gage provided with my improvements. In this gage, instead of a corrugated steel diaphragm or disk, an india-rubber diaphragm, situated in a small chamber at the head of the gage, is employed. $h$ is the small chamber at the highest part of the gage, into the top of which the pipe which conveys the steam to the gage is screwed. $i$ is an india-rubber diaphragm, the deflection of which is transmitted by a rod and gearing to the index-finger $k$, traversing the graduated dial $l$. In the said small chamber $h$ quicksilver or mercury is placed, as indicated by the broken lines, the said mercury covering and protecting the upper surface of the diaphragm $i$. The steam acts directly upon the mercury, and through the said mercury upon the diaphragm $i$.

Fig. 4 represents a Bourdon gage, to which my invention is applied, the said gage having a steam-pipe at bottom, of the usual siphon form. The bent or curved part $m^2$ of the siphon-pipe is filled with quicksilver or mercury. When the steam, the pressure of which is to be registered, is admitted into the pipe at $m$, it acts upon the mercury in the siphon-pipe $m^2$, and causes the said mercury to act on the bent tube of the gage, and to register the pressure. On the steam being shut off from the pipe at $m$ the mercury returns to its original position in the siphon-pipe $m^2$.

Instead of applying to a Bourdon gage the siphon-pipe $m^2$, containing mercury, a tube similar to that represented at $g$, Figs. 1 and 2, may be employed, the said tube containing mercury being connected with the gage at top.

Although I have represented the best means with which I am acquainted of carrying my invention into effect, yet I do not limit myself thereto, as the position and shape of the chamber or part containing the quicksilver or mercury may be varied, so long as the said mercury is placed in such a manner as to cut off communication between the diaphragm-chamber or measuring agent and the water, steam, air, or other liquid or fluid, the pressure of which is to be registered.

Having now described the nature of my invention, and the manner in which the same is to be performed, I wish it to be understood that I claim as my invention—

The described improvement in diaphragm and Bourdon gages, which consists in interposing between the diaphragm or measuring-tube and the steam or other moving agent, mercury or quicksilver, substantially in the manner and for the purposes set forth.

JAMES BURDEN. [L. S.]

Witnesses:
   RICHARD SKERRETT,
   HENRY SKERRETT,
      *Of* 37 *Temple Street, Birmingham.*